No. 767,256. PATENTED AUG. 9, 1904.
B. O. WAGNER.
ELECTRIC SEMAPHORE SIGNAL MECHANISM.
APPLICATION FILED MAY 7, 1903.
NO MODEL. 4 SHEETS—SHEET 1.
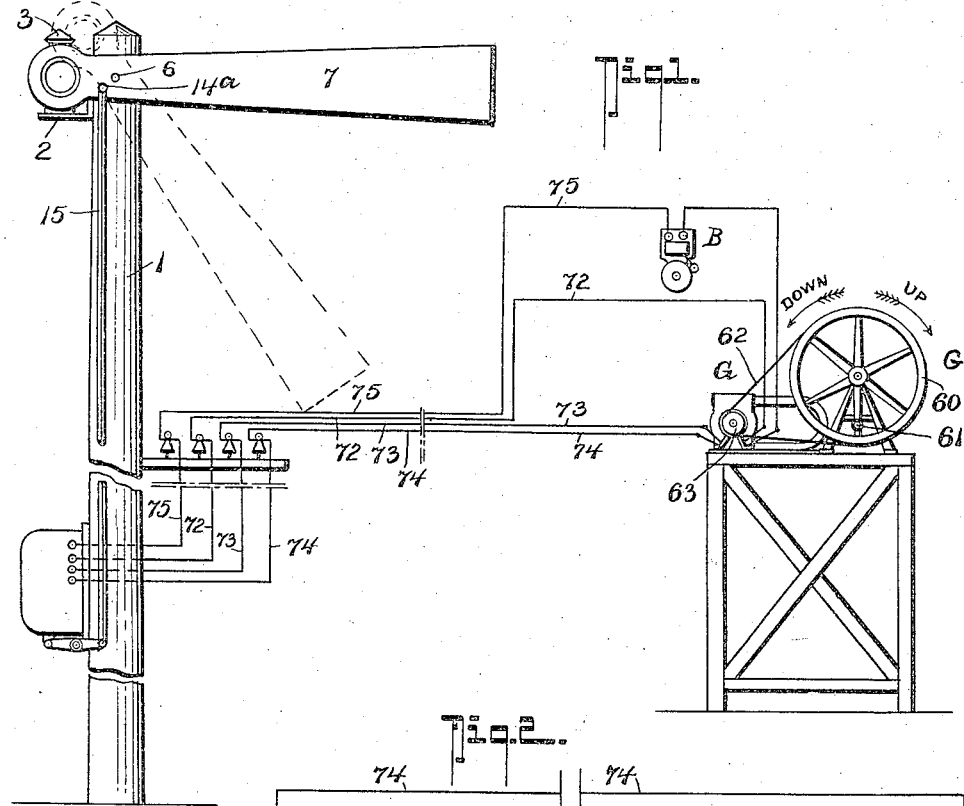
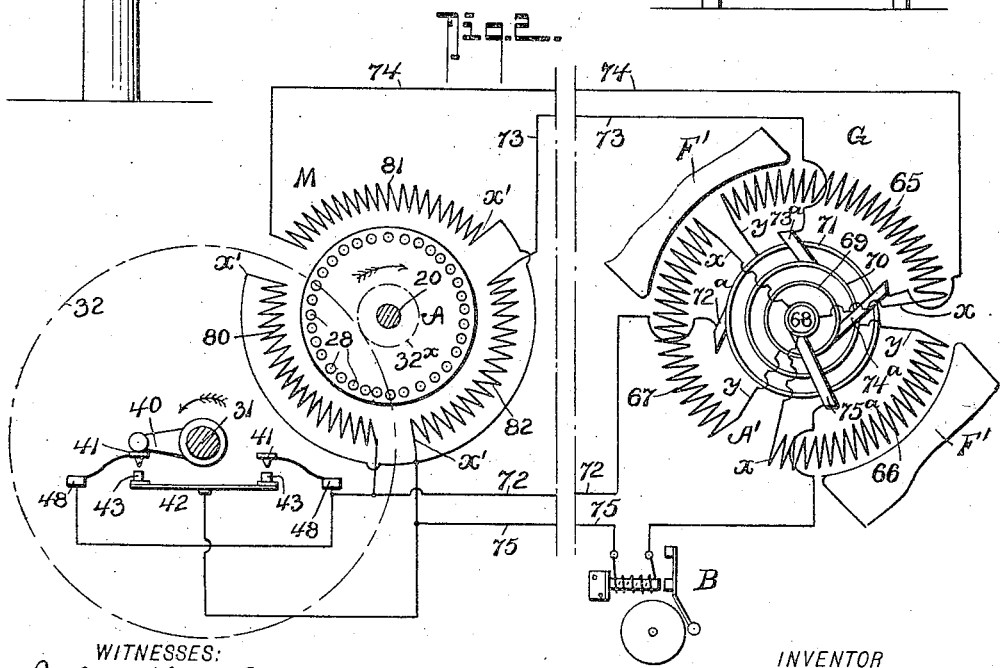
WITNESSES:
John T. Schrott.
T. C. Gibson.
INVENTOR
B. O. Wagner.
BY
Fred G. Dieterich & Co.
ATTORNEYS.

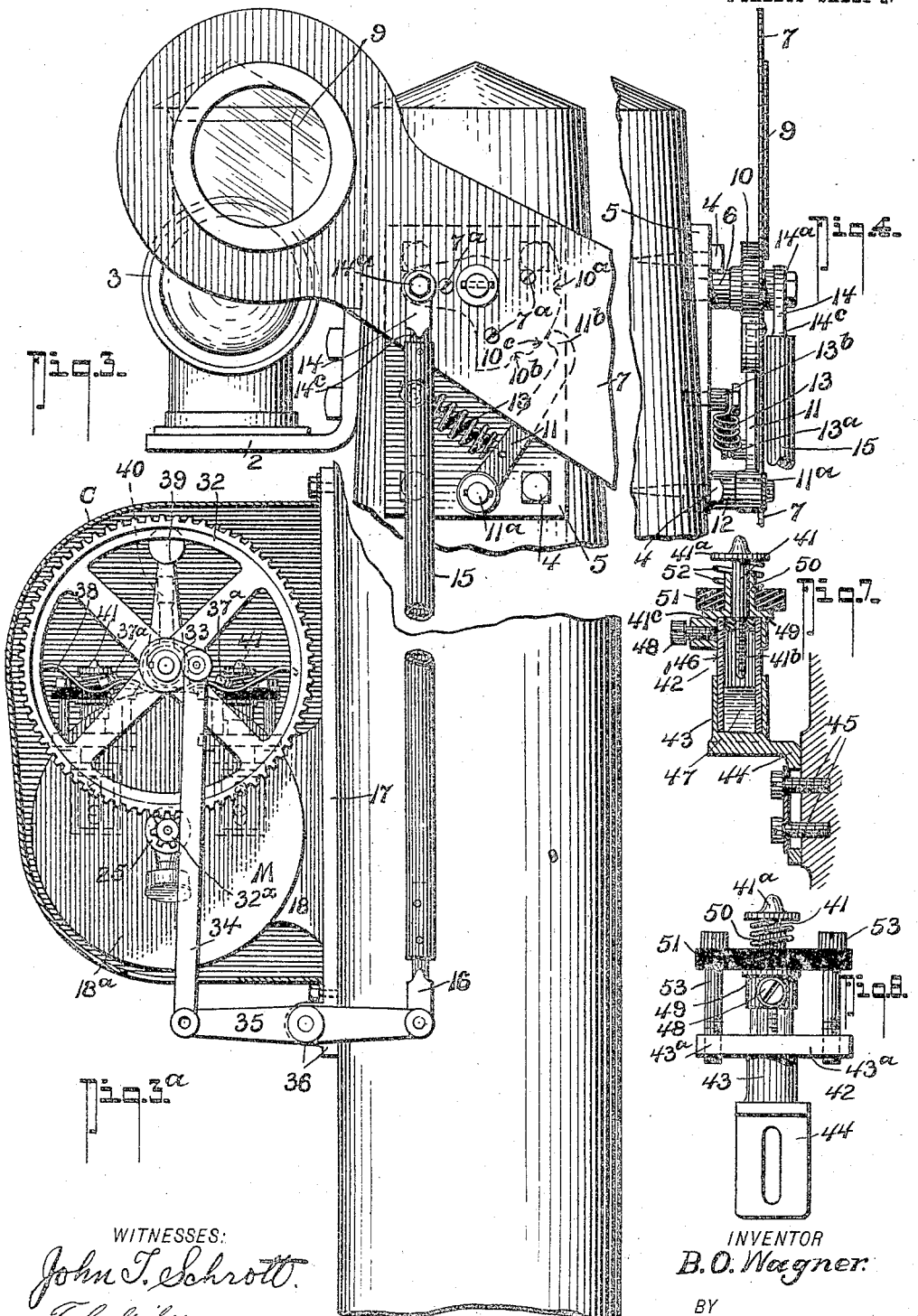

No. 767,256. PATENTED AUG. 9, 1904.
B. O. WAGNER.
ELECTRIC SEMAPHORE SIGNAL MECHANISM.
APPLICATION FILED MAY 7, 1903.
NO MODEL. 4 SHEETS—SHEET 3.
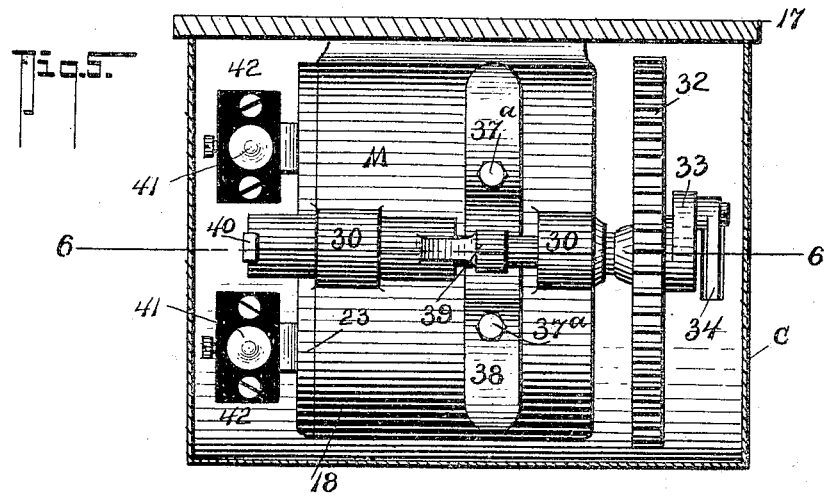
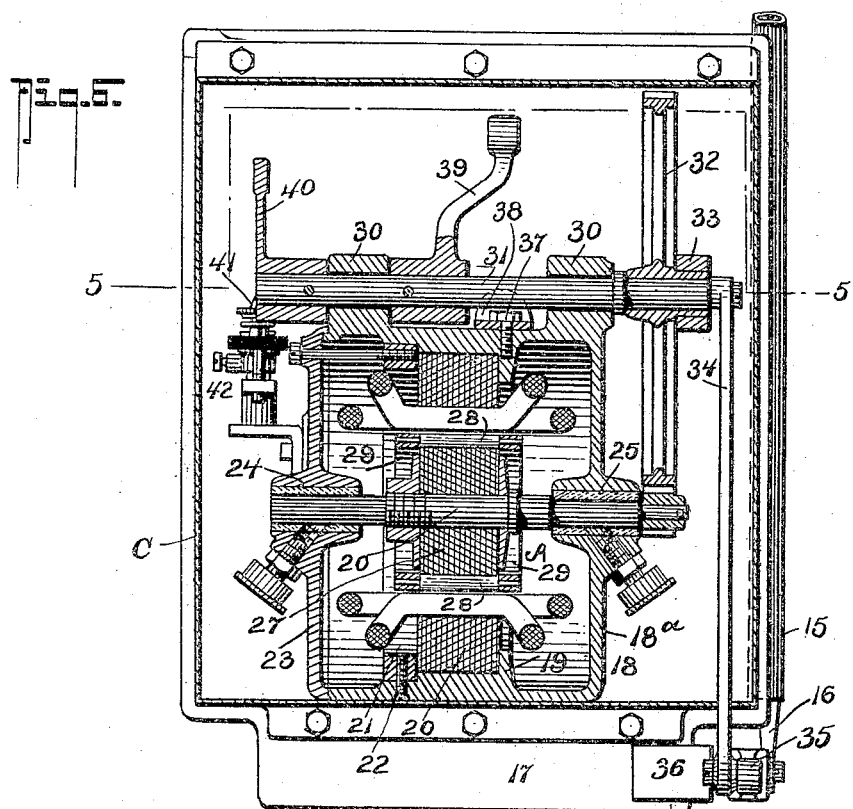
WITNESSES:
John T. Schrott,
T. C. Gibson,
INVENTOR
B. O. Wagner.
BY
Fred G. Dieterich & Co.
ATTORNEYS.

No. 767,256. PATENTED AUG. 9, 1904.
B. O. WAGNER.
ELECTRIC SEMAPHORE SIGNAL MECHANISM.
APPLICATION FILED MAY 7, 1903.
NO MODEL. 4 SHEETS—SHEET 4.
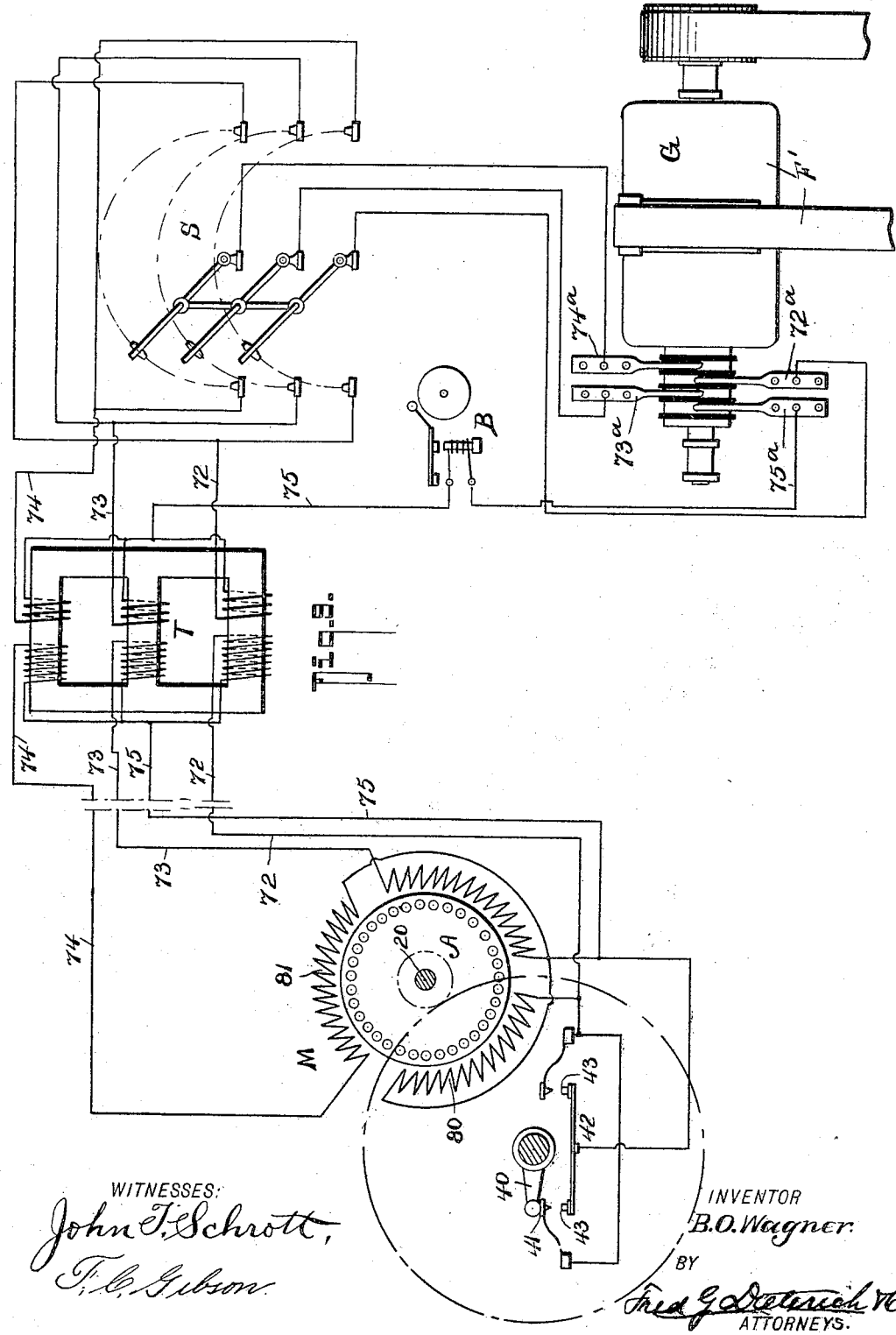
WITNESSES:
John T. Schrott,
T. C. Gibson
INVENTOR
B. O. Wagner.
BY
Fred G. Dieterich & Co.
ATTORNEYS.

No. 767,256.

Patented August 9, 1904.

UNITED STATES PATENT OFFICE.

BRUNO OTTO WAGNER, OF AMSTERDAM, NEW YORK, ASSIGNOR TO THE MAGNETO ELECTRIC COMPANY, INCORPORATED, OF AMSTERDAM, NEW YORK.

ELECTRIC SEMAPHORE-SIGNAL MECHANISM.

SPECIFICATION forming part of Letters Patent No. 767,256, dated August 9, 1904.

Application filed May 7, 1903. Serial No. 156,034. (No model.)

*To all whom it may concern:*

Be it known that I, BRUNO OTTO WAGNER, a subject of the Emperor of Germany, residing in Amsterdam, in the county of Montgomery and State of New York, have invented certain new and useful Improvements in Electric Semaphore-Signal Mechanisms, of which the following is a specification.

This invention relates to improvements in electrically-operated semaphore mechanisms, including a movable signal-blade; and it primarily seeks to provide electrically controlled and operated means for shifting said blade to either of its signaling positions.

In its more generic nature my invention embodies an electric motor for operating the semaphore-blade, said motor being adapted for operation on a three-phase electric circuit in which is included three main conductors and a neutral wire therefor. The electric motor also includes means for short-circuiting one phase of the circuit at predetermined times whereby to cause a current to flow through the neutral wire and operate an indicating-bell at the signal-operating station, so that the operator may readily ascertain when the signal-blade on the semaphore is set to its proper position.

A further object of my invention is to so arrange the circuits that the three main wires are equalized to prevent any current flowing through the neutral wire during the operation of the motor and also to prevent any current flowing through the neutral wire while the motor is inoperative after the semaphore is set.

Specifically, my invention consists in the novel construction and combination of parts, which will first be described in detail and then specifically pointed out in the appended claims, reference being had to the accompanying drawings, in which—

Figure 1 is a diagrammatic view of my system complete. Fig. 2 is an enlarged diagrammatic view of the generator and motor circuits. Fig. 3 is an enlarged detail view of the semaphore-blade in a position intermediate the safety and danger position and the manner of fastening the same to the pole. Fig. 3$^a$ is a side elevation, parts being in section, of the semaphore-operating motor mechanism. Fig. 4 is a side elevation of the parts shown in Fig. 3. Fig. 5 is a horizontal section taken on the line 5 5 of Fig. 6. Fig. 6 is a cross-section on the line 6 6 of Fig. 5. Fig. 7 is a cross-section of one of the contact-makers. Fig. 8 is a front elevation thereof. Fig. 9 is a diagrammatic view of a slightly-modified form of my invention.

Referring now to the accompanying drawings, in which like numerals and letters of reference indicate like parts in all of the figures, 1 designates the semaphore-pole, near the upper end of which is mounted upon a bracket 2 the signal-light 3, which may be of any approved construction. Secured to the pole near its upper end by bolts 4 or otherwise is a metallic plate 5, from which a stud 6 is projected and upon which stud is fulcrumed a semaphore-blade 7, having the usual color-disk 9, as clearly shown in Figs. 3 and 4. Fulcrumed upon the said stud 6 between the plate 5 and the semaphore-blade 7 and rigidly secured to the semaphore-blade by screws 7$^a$ is a second plate 10, having circumferential notches 10$^a$ 10$^b$, with which at predetermined times a catch 11, fulcrumed at 11$^a$ on the stud 12 upon the base-plate 5, is adapted to engage. The catch 11 has a finger portion 11$^b$, which seats in one of the circumferential notches 10$^a$ 10$^b$ of the plate 10 when the signal-blade 7 is at either of its signaling positions, and the said catch 11 is normally held with its finger 11$^b$ in engagement with the circumferential portion 10$^c$ of the plate 10 by a coil-spring 13, secured at one end to the stud 13$^a$, carried by the catch 11, and at the other end to the stud 13$^b$ on the base-plate 5. (See Figs. 3 and 4.) When the blade is in its horizontal or danger position, the finger 11$^b$ engages the notch 10$^b$, and when the blade is in its down or safety position the finger 11$^b$ engages the notch 10$^a$. The semaphore-blade is shown as moving from one position to another in Fig. 3. It must be understood, however, that the blade does not normally remain in said position at any time.

Pivotally secured at 14ª to the semaphore-blade is a flat rod-section 14, having a circular portion 14ᶜ, adapted to fit into and to be secured to the upper end of a hollow tubular rod 15, carrying at its lower end a similar flat rod-section 16 for a purpose presently to appear.

At a suitable point below the semaphore-blade a second metallic plate 17 is secured to the pole 1, and on this plate the motor M is mounted. By referring now more particularly to Figs. 3ª, 5, and 6 it will be seen that the motor M consists of a casing or shell 18, of a magnetic material, such as iron or steel, and the said casing is open at one end, whereby access may be had to the parts mounted within the casing. Integrally and internally formed with the shell or casing 18 is a web 19, against which a field-core 20, which may be laminated, if desired, fits, and the said field-core is held in place by a ring 21, secured by bolts 22 to the casing or shell 18. A cap 23, having a centrally-disposed bearing 24, in which and in another bearing, 25, in the side wall 18ª of the casing the armature-shaft 20 is mounted, is fitted over the open end of the casing 18. The armature A, which is of the well-known squirrel-cage type, consists of a solid or laminated iron core 27 and the spaced conductors 28, insulated from each other and the core 27 in the usual manner and short-circuited at their ends by conducting-rings 29, with which the conductors 28 are in electrical contact, as clearly shown in Fig. 6.

Integrally formed upon the top of the motor-casing is a pair of bearings 30, in which is mounted a shaft 31, carrying at one end a gear-wheel 32, having a crank 33, to which a rod 34, pivotally secured at its lower end to one end of a rockable lever 35, is fulcrumed. The lever 35 is in turn fulcrumed to a bracket 36 on the base 17, and the flat rod-section 16 of the rod 15 is pivotally secured to the other end of the said lever 35.

Mounted upon the top of the casing 18 and securely held by bolts 37 37ª is a stout flat spring 38, with which an arm 39, secured to and movable with the shaft 30, is adapted to coöperate for a purpose presently understood. The tension of the spring 38 may be regulated by adjusting the bolts 37ª.

To the end of the shaft 31 opposite the gear 32 a second arm 40 is fixedly secured, which arm within predetermined times engages a plunger 41 of mercury contacts 42. (Best shown in Figs. 7 and 8, by reference to which it will be seen the contacts 42 each consists of a cup-shaped metallic portion 43, having a bracket 44, by which the contacts are secured to the cap 23 by bolts 45.) The cup-shaped portion 43 has an internal bore within which is mounted a glass or other insulating tube 46, adapted to contain mercury 47 in contact with the bottom of the bore in the cup-shaped portion 43 as shown.

Upon the upper end of the tube 46 is secured a second metallic member 49, having an apertured extension 50, in which a plunger 41 is movable. The plunger 41 has a cap portion 41ª, between which and an insulating-block 51 is a coil-spring 52 for holding the plunger with its contacting end 41ᵇ out of engagement with the mercury 47. Said end is screw threaded to receive a check-nut 41ᶜ to prevent the accidental withdrawal of the plunger. To secure the parts together, I provide screw-bolts 53 53, which pass through apertures in the insulated block 51 and engage with the screw-threaded apertures in the extensions 43ª of the metallic cup-shaped portion 47. (See Figs. 7 and 8.)

The screw-bolts 48 45 serve as binding-screws for the circuit-terminal.

Referring now more particularly to Figs. 1 and 2, it will be seen that I provide a generator G, consisting of an armature A' and a suitable constant field F', for producing a three-phase current. The armature A' receives motion in the preferred form of my invention from the hand power-wheel 60, having a crank 61, and over the rim thereof takes a belt 62, which passes over a pulley 63 on the armature-shaft. The armature A' of the generator G is provided with three separate coils 65 66 67, each of which have their endings connected to the insulated collector-ring 68 on the armature-shaft, while the other ends $y$, the beginnings of the coils 65 66 67, are connected to the separate collector-rings 69 70 71, also mounted and insulated on the armature-shaft. The main-wire terminals 72 73 74 connect through brushes 72ª 73ª 74ª to the collector-rings 69 70 71 to the coils 65 66 67, respectively, while the neutral wires 75, to which is connected an indicating-bell B, as shown, connect through the brush 75ª with the collector-ring 68. The generator G and bell B are preferably located at a signal tower or station.

The motor M has three field-coils 80 81 82, whose endings $x'$ are connected to the cup-shaped portion 43 of the mercury contacts 42 and the neutral wire 75, while the other beginnings of the coils 80 81 82 are respectively connected to the main wires 72 73 74. One of the beginnings of one of the coils 80 is connected to the binding-screws 48, which are in electrical contact with the plunger 41. (See Fig. 2.)

The armature-shaft of the motor M carries a pinion 32ˣ, with which the gear-wheel 32 meshes, whereby motion is imparted to the said gear-wheel when the motor is in operation.

So far as described the operation of my invention will be best explained as follows: Assuming the semaphore-blade to be in the position shown in Fig. 1, the operator desiring to set the blade to its lowermost position turns the crank 61 in the direction of the arrow marked "Down," thereby rotating the armature A' and starting up a current in the coils 65 66 67, which passes over the line-wire 72 73 74 into the field-coil of the motor. This causes induction-currents in the squirrel-cage armature A, which then revolves in the direction indicated in Fig. 2, imparting motion to the gear 32, which causes the contact-operating arm 40 and the spring-engaging arm 39 to move in the direction indicated by the arrow in Fig. 2. This causes the semaphore-blade 2 to be lowered through the medium of the rods 15 34, lever 35, and crank 33, it being understood the contact-operating arm 40 does not come into engagement with the plunger 41 until the notch $10^a$ has passed the finger $11^b$ of the catch 11. As the notch $10^a$ passes the finger $11^b$ the arm 39 will engage the spring 38 and push it down toward the casing 18. As the semaphore-blade reaches the limit of its downward movement the contact-operating arm 40 will engage the plunger 41 and press it down to close the circuit. This causes a short-circuiting of the coil 80 of the motor-field, and thereby disturbs the electrical and inductive equilibrium between the coils 80 81 82, which causes a current to pass through the neutral wire 75 and operate the indicating-bell B. The operator upon the striking of the bell B ceases turning the crank 61, thereby stopping the generator G and causes the flow of current to the motor to stop. The spring 38 then pushes the arm 39 up until the semaphore-blade is in the proper position with the finger $11^b$ in engagement with the notch $10^a$. Since the finger $11^b$ engages the notch $10^a$, the parts when once set will be steadily held in their proper positions. The return movement imparted to the shaft 31 by the spring 38 also serves to release the arm 40 from the plunger 41, and thereby allows the plunger 41 to recede and open the circuits at the contacts 42, again bringing the circuits in their normal relations. Now should the operator desire to return the semaphore-blade to its horizontal position he merely reverses the direction of rotation of the crank 61—i. e., in the direction indicated by the arrow marked "Up"—when the same series of operations just described are repeated. The current generated in the generator-aramature coils being reversed by reason of the reverse rotation of the armature, the motor will rotate in the opposite direction and raise the semaphore-blade. When the poles 1 are located at some distance away from the operating-tower, I prefer to use a static transformer T, held to raise the electromotive force of the circuit. (See Fig. 9.) I may also find it more convenient to have the generator G power-driven, as shown in Fig. 9, and when this is the case I use a reversing-switch S in the main-wire circuits, as clearly shown in said Fig. 9.

While I have shown but a single semaphore-blade, I desire it understood that I may operate a plurality of semaphore-blades by the same generator, and when such is the case I provide suitable cut-in and cut-out switches (not shown) for each circuit.

From the foregoing description, taken in connection with the accompanying drawings, it will be seen that the signal-bell is not rung until after the semaphore-blade has passed its proper indicating position and that the instant the current ceases to flow from the generator the spring upon the motor-casing will return the semaphore a short distance until it reaches its proper indicating position.

Moving the semaphore-blade to its locked position by spring-pressure permits the motor to be always started without any current in the neutral wire.

Other advantages of my invention will be readily apparent to those skilled in the art to which it appertains.

To protect the motor mechanism from the weather, I provide a cover C, bolted to the plate 17, as shown.

Having thus described my invention, what I claim, and desire to secure by Letters Patent, is—

1. A signal mechanism of the character stated, comprising in combination with a semaphore-blade, means for raising and lowering said blade said means including an electric motor, an alarm in circuit with said motor adapted for operation when the semaphore-blade has passed its signaling position, and means for automatically returning said blade to its signaling position at predetermined times.

2. A signal mechanism of the character stated, comprising in combination with a semaphore-blade, means for raising and lowering said blade said means including an electric motor, an alarm in circuit with said motor adapted for operation when the semaphore-blade has passed its signaling position, means for automatically returning said blade to its signaling position after the electric motor ceases to operate as such, and means for locking the said blade to either of its signaling positions.

3. A signal mechanism of the character stated, comprising in combination with a semaphore-blade, means for raising and lowering said blade said means including an electric motor, an alarm in circuit with said motor adapted for operation when the semaphore-blade has passed its signaling position, means for automatically returning said blade to its signaling position after the electric motor ceases to operate as such, means for locking the said blade to either of its signaling positions, said means including a circumferentially-apertured plate and a catch for engaging the same.

4. A signal mechanism of the character stated, comprising in combination with a semaphore-blade, means for raising and lowering said blade said means including an electric motor, an alarm in circuit with said motor adapted for operation when the semaphore-blade has passed its signaling position, means for automatically returning said blade to its signaling position after the electric motor ceases to operate as such, means for locking the said blade to either of its signaling positions, said means including a circumferentially-apertured plate carried by the blade and a catch for engaging the same.

5. A signal mechanism of the character stated, comprising in combination with a semaphore-blade, means for raising and lowering said blade, said means including an electric motor, an alarm in circuit with said motor adapted for operation when the semaphore-blade has passed its signaling position, means for automatically returning said blade to its signaling position after the electric motor ceases to operate as such, and means for locking the said blade to either of its signaling positions, said means including a circumferentially-apertured plate carried by the blade, and a catch having a finger for coöperating with said circumferential apertures of the plate whereby to lock the blade in its signal position.

6. A signal mechanism of the character stated, comprising in combination with a semaphore-blade, means for setting the blade to each of its signaling positions, said means including a three-phased electric motor, means for operating said motor, said means including a three-phased generator, main-line wires for conducting the current from the generator to the motor, and a neutral wire connecting the generator and motor, an alarm-bell operatively connected to said neutral wire, means for energizing said neutral wire at predetermined times, for the purposes specified.

7. In a semaphore mechanism of the character described, a semaphore-blade, means for raising and lowering said blade at predetermined times, said means including a three-phased generator and motor, a neutral-wire connection between the generator armature-coils and the motor field-coils, a signal-bell connected in series with said neutral wire, and means for energizing said neutral wire at predetermined times, for the purposes specified.

8. In a semaphore mechanism of the character described, a semaphore-blade, means for raising and lowering said blade at predetermined times, said means including a three-phased generator and motor, a neutral-wire connection between the generator armature-coils and the motor field-coils, a signal-bell connected in series with said neutral wire, means for short-circuiting one coil of the motor at predetermined times, for the purposes described.

9. In a semaphore mechanism of the character described, a semaphore-blade, means for raising and lowering said blade at predetermined times, said means including a three-phased generator and motor, a neutral-wire connection between the generator armature-coils and the motor field-coils, a signal-bell connected in series with said neutral wire, means for short-circuiting one coil of the motor at predetermined times, whereby to cause a current to flow through the neutral wire and operate the signaling-bell.

10. In a semaphore mechanism of the character described, a semaphore-blade, means for raising and lowering said blade at predetermined times, said means including a three-phased generator and motor, a neutral-wire connection between the generator armature-coils and the motor field-coils, a signal-bell connected in series with said neutral wire, means for short-circuiting one coil of the motor at predetermined times, whereby to cause a current to flow through the neutral wire and operate the signaling-bell, said motor-coil short-circuiting means including a contact-maker carried by the motor.

11. In a signaling mechanism of the character stated, a three-phased current-generator, a motor connected therewith, said motor having its field-coils in circuit with the armature-coils of the generator, a neutral wire connecting said generator and motor-coils, a signal-bell connected in series with said neutral wire, means carried and operated by the motor for short-circuiting one motor field-coil whereby to cause a current to flow through the neutral wire and operate the signal-bell, for the purposes specified.

12. A signaling mechanism of the character stated, comprising in combination with a semaphore-blade, a circumferentially-apertured disk connected therewith and a catch for engaging said disk said catch having a finger portion for coöperating with the circumferential apertures of the semaphore-disk, of an operating mechanism for said semaphore-blade, said mechanism including an electric motor, a crank-arm geared with said motor and connected with said semaphore-blade, means for operating said electric circuits, said means including a neutral wire connected with said motor, a signaling-bell coöperatively joined with said neutral wire, contacts carried by the motor-casing in electrical connection with said neutral wire and with the motor-field, a spring member mounted upon the motor-casing, an arm for engaging with said spring member as the motor moves the semaphore-blade to the limit of its movement, an arm geared with the motor for engaging said spring at predetermined times, a second arm movable in unison with the first arm for operating the aforesaid neutral-wire-motor field-contacts whereby the alarm is rung as the semaphore-blade reaches the limit of its movement in either direction, said spring together with its engaging arm being adapted to return the semaphore-blade sufficiently to allow the catch to engage with one of the circumferential apertures of the plate carried by the semaphore-blade.

13. A signaling mechanism of the character described, comprising in combination with a semaphore-blade, a circumferentially-apertured disk connected therewith and a catch for engaging said disk said catch having a finger portion for coöperating with the circumferential apertures of the semaphore-disk, of an operating mechanism for said semaphore-blade, said mechanism including an electric motor, a crank-arm geared with said motor and connected with said semaphore-blade, means for operating said electric motor, said means including a neutral wire connected with said motor, a signaling-bell coöperatively joined with said neutral wire, contacts carried by the motor-casing in electrical connection with said neutral wire and with the motor-field, a spring member mounted upon the motor-casing, an arm for engaging with said spring member as the motor moves the semaphore-blade to the limit of its movement, an arm geared with the motor for engaging said spring at predetermined times, a second arm movable in unison with the first arm for operating the aforesaid neutral-wire-motor field-contacts whereby the alarm is rung as the semaphore-blade reaches the limit of its movement in either direction, said spring together with its engaging arm being adapted to return the semaphore-blade sufficiently to allow its catch to engage with one of the circumferential apertures of the plate carried by the semaphore-blade, said spring and its engaging arm also serve to disengage the contact-operating arm from the contact whereby to open the motor field-circuit, for the purposes specified.

14. In a motor-operating mechanism for electric semaphore devices, a base-plate, a motor mounted thereon, said motor including an outer casing, bearings integrally formed upon the upper portion of said casing, a shaft journaled in said bearings and carrying a gear-wheel at one end, an armature and an armature-shaft for said motor journaled in the outer walls of said casing, a pinion on one end of said armature-shaft adapted to mesh with said gear-wheel, a flat spring mounted upon the upper portion of said motor-casing, an arm carried by the shaft carrying the gear-wheel, for engaging with said spring at predetermined times, said spring and said arm serving to partially rotate said shaft and gear-wheel at predetermined times, a second arm mounted upon the said gear-wheel-carrying shaft, a pair of contact-making devices mounted upon the motor-casing and adapted to coöperate with said second arm, said contact-making device serving to short-circuit an armature-coil of the motor for the purposes specified.

B. OTTO WAGNER.

Witnesses:
R. B. Hoover,
W. H. Niles.